United States Patent [19]

Kanai

[11] Patent Number: 4,891,664
[45] Date of Patent: Jan. 2, 1990

[54] ILLUMINATION DEVICE FOR COPYING APPARATUS AND THE LIKE

[75] Inventor: Nobuo Kanai, Osaka, Japan

[73] Assignee: Minolta Camera Kabushiki Kaisha, Osaka, Japan

[21] Appl. No.: 205,219

[22] Filed: Jun. 10, 1988

[30] Foreign Application Priority Data

Jun. 15, 1987 [JP] Japan ................. 62-148847

[51] Int. Cl.⁴ .................. G03B 27/54; G03B 27/72
[52] U.S. Cl. ........................... 355/67; 355/71
[58] Field of Search ............. 355/1, 46, 70, 71, 67

[56] References Cited

U.S. PATENT DOCUMENTS 3,807,856  4/1974  Rodriguez ................. 355/67

FOREIGN PATENT DOCUMENTS 50-11523   2/1975  Japan .
51-74440   6/1976  Japan .
53-104631  8/1978  Japan .
54-174343 12/1979  Japan .
58-115455  7/1983  Japan .
59-9673    1/1984  Japan .

Primary Examiner—Richard A. Wintercorn
Attorney, Agent, or Firm—Price, Gess & Ubell

[57] ABSTRACT

An illumination device for use in copying apparatus and the like for illuminating an original, the device having an elongated light source and reflecting members each of which is disposed at each side of the optical path from the original to a transmission system for transmitting the image light. The reflecting members reflect the light from the elongated light source toward the vicinity of opposite end portions of the illumination area in the longitudinal direction of the source. The device gives a uniform illumination intensity distribution and achieves a high illumination efficiency with a simple construction.

10 Claims, 3 Drawing Sheets width of image

4,891,664

ILLUMINATION DEVICE FOR COPYING APPARATUS AND THE LIKE

FIELD OF THE INVENTION

The present invention relates to an illumination device for use in copying apparatus and the like for illuminating an original, and more particularly to such a device having an elongated light source

BACKGROUND OF THE INVENTION

In conventional copying apparatus or the like, an elongated light source in the form of a rod is used for illuminating originals. The elongated light source, such as a fluorescent lamp, has an uneven distribution of illumination intensities in the longitudinal direction thereof. The illumination intensity of the area illuminated with the light source is substantially uniform at the center portion in the longitudinal direction of the source but is lower in the vicinity of opposite end portions. Therefore, a light source sufficiently greater in length than the area to be illuminated may be employed so as to give the area a uniform distribution of illumination intensities, but the light source will then render the apparatus larger.

To overcome this problem, Unexamined Japanese Utility Model Publication No. SHO 54-174343 discloses an illumination device which comprises a fluorescent lamp serving as a light source for illuminating originals and a trapezoidal light blocking plate interposed between the lamp and the surface of the original and having an upper side which has the same length as the uniform light emitting portion of the lamp. Unexamined Japanese Utility Model Publication SHO No. 59-9673 proposes to dispose a reflecting plate at one side of a tubular light source for illuminating an original at the other side thereof, the reflecting plate having a small reflectance at its middle portion with respect to the longitudinal direction of the light source and a great reflectance at its opposite ends.

However, the devices of the two publications are adapted to give a uniform illumination intensity distribution by decreasing the illumination intensity at the middle portion and therefore have the problem of being low in illumination efficiency and deficient in the quantity of light available at the position to be illuminated.

SUMMARY OF THE INVENTION

Accordingly, the main object of the invention is to provide an illumination device which gives a uniform illumination intensity distribution and achieves a high illumination efficiency with a simple construction.

Another object of the invention is to provide an illumination device which comprises a light source in the form of a rod and adapted to afford an increased illumination intensity at its lengthwise opposite ends so as to give a uniform illumination intensity distribution.

These objects can be fulfilled by an illumination device comprising an elongated light source for illuminating an original, transmission means for transmitting the light from the illuminated original to a receiving plane, and a reflecting means disposed at each side of the optical path from the original to the transmission means with respect to the longitudinal direction of the elongated light source for reflecting the light from the light source toward the original.

BRIEF DESCRIPTION OF THE DRAWINGS

These and other objects or features of the present invention will become apparent from the following description of a preferred embodiment thereof taken in conjunction with the accompanying drawings, in which.

In the following description, like parts are designated by like reference numbers throughout the several drawings.

DESCRIPTION OF THE PREFERRED EMBODIMENT

An illumination device embodying the invention will be described below.

Figure 1:
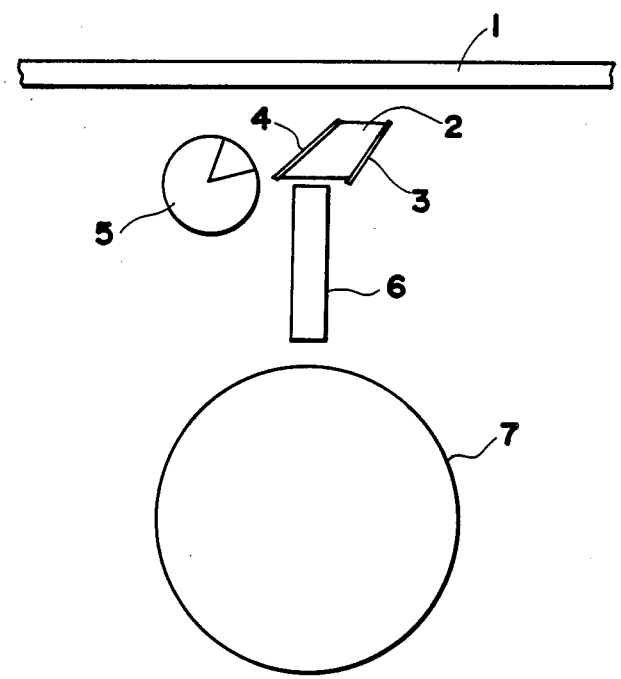
FIG. 1 is a view in section schematically showing an illumination device of the invention.
Figure 2:
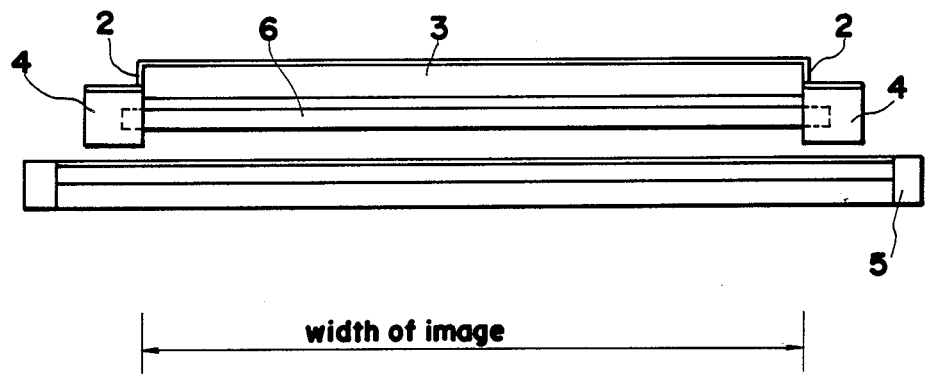
FIG. 2 is a plan view of the device.
Figure 3:
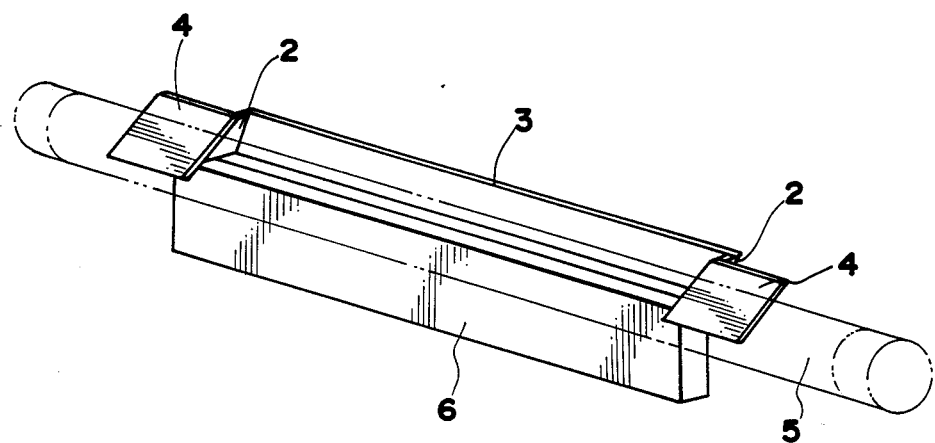
FIG. 3 is a perspective view of the device.

FIGS. 1, 2 and 3 are a schematic sectional view, plan view and perspective view, respectively, of the embodiment. The illumination device comprises side reflecting plates 2, a first reflecting plate 3, second reflecting plates 4, a fluorescent lamp 5 in the form of a rod and serving as a light source, and a lens array 6. An unillustrated original placed on a document support glass plate 1 is illuminated with the light directed directly from the lamp 5 toward the original and also with the light emitted by the lamp and reflected from the first and second reflecting plates 3, 4 and the side reflecting plates 2. The light reflected from the original is projected on a photosensitive member 7 by the lens array 6 to produce a copy by a usual copying process.

The first reflecting plate 3 is disposed at one side of the optical path from the original to the lens array 6, with the fluorescent lamp 5 provided on the other side of the path. The second reflecting plates 4 are arranged immediately above the lens array 6 and positioned at opposite sides of the optical path which are opposed to each other longitudinally of the lamp 5. The first reflecting plate 3 is provided for the area to be illuminated and corresponding to the width of images, while the second reflecting plates 4 are provided outside the area. The first reflecting plate 3 is connected to the second reflecting plates 4 by the respective side reflecting plates 2.

Figure 4:
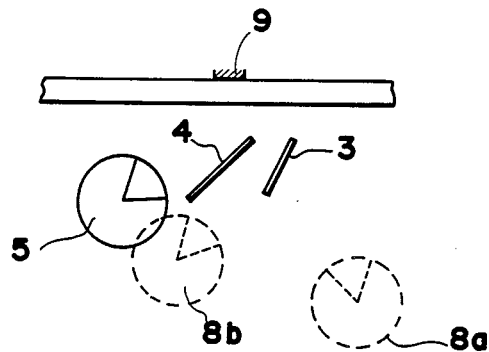
FIG. 4 is a diagram showing the positions of mirror images formed by reflecting plates.

With the reflecting plates thus arranged, the mirror image 8b of the fluorescent lamp 5 formed by the second reflecting plate 4 can be positioned closer to the position 9 to be illuminated and also to a position vertically below this position 9 than the mirror image 8a of the lamp 5 formed by the first reflecting plate 3 as shown in FIG. 4. Accordingly, when the light source has uniform brightness longitudinally thereof, the areas illuminated by the second reflecting plates 4 can be made higher in reflectance than the area illuminated by the first reflecting plate 3, with the result that the opposite end portions of the area to be illuminated, corresponding to opposite ends of the lamp 5, can be illuminated with an improved efficiency. In other words, the opposite end portions of the illumination area are illuminated with the light from the first reflecting plate 3 and additionally with light of increased from the second reflecting plates 4.

In the arrangement described above, the first reflecting plate 3 is disposed at one side of the path of travel of the image light reflected at the original, opposite to the other side thereof where the lamp 5 is provided, so as not to block the optical path. The second reflecting plates 4 are arranged at opposite sides of the optical path for the image light which are opposed to each other longitudinally of the lamp 5, so that these plates 4 reflect the illuminating light from the lamp 5 without blocking the image light.

According to the construction of the present embodiment, the first reflecting plate 3 is connected to the second reflecting plates 4 by the side reflecting plates 2 in the form of an integral reflector. The integral reflector can be prepared very easily by bending a single reflecting plate.

Figure 5:
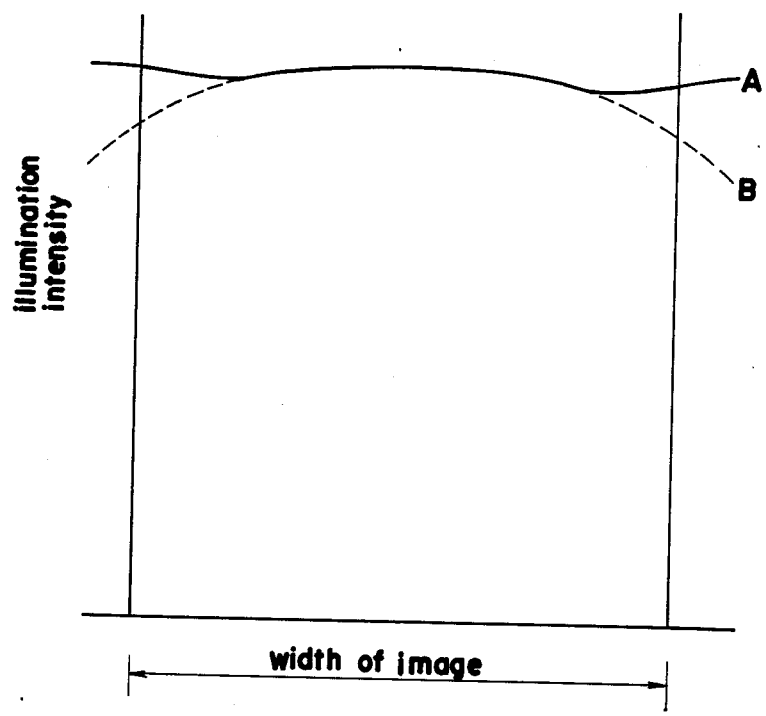
FIG. 5 is a diagram showing the distributions of illumination intensitives given by a conventional device and the device of the invention over the width of an image.

To sum up, the opposite end portions of the area to be illuminated can be illuminated with an improved efficiency by the provision of the second reflecting plates, thereby effectively precluding a reduction in the quantity of light at these end portions. Stated more specifically with reference to FIG. 5, the conventional illuminating device (which is not provided with the second reflecting plates) gives a decreased quantity of light to the opposite end portions as represented by curve B (broken line), whereas the decrease in the quantity of light can be effectively compensated for by the illuminating device of the present embodiment as represented by curve A (solid line).

Either a plane mirror or curved mirror may be used as each of the reflecting plates of the present illumination device.

Although the area to be illuminated is illuminated with the direct light from the lamp 5 and the indirect light reflected from the first, second and side reflecting plates 3, 4 and 2 according to the foregoing embodiment, the contemplated effect of the invention can be achieved to some extent even when the first and side reflecting plates 3, 2 are omitted to use the direct light from the lamp 5 and the indirect light from the second reflecting plates 4 only for illumination.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An illumination device comprising:
   an elongated light source for illuminating an original;
   a lens array extended to the longitudinal direction of the elongated light source for transmitting the light from the illuminated original to a receiving plane; and
   reflection means disposed at each side of the optical path from the original to the lens array with respect to the longitudinal direction of the elongated light source for reflecting the light from the light source toward the original.

2. An illumination device as claimed in claim 1, wherein said reflection means are positioned opposed to the outside of the area to be illuminated.

3. An illumination device comprising:
   an elongated light source for illuminating an original;
   transmission means for transmitting the light from the illuminated original to a receiving plane;
   a first and second reflecting plate, each of which is disposed at each side of the optical path from the original to the transmission means with respect to the longitudinal direction of the elongated light source for reflecting the light from the light source toward the original, and
   a third reflecting plate disposed at the opposite side to said elongated light source with respect to said optical path and extended to the longitudinal direction of the elongated light source for reflecting the light from the light source toward the original.

4. An illumination device as claimed in claim 3, wherein said first and second reflecting plates are opposed to the outside of the illumination area and said third reflecting plate is opposed to the illumination area.

5. An illumination device as claimed in claim 4, further comprising a fourth and fifth reflecting plate for connecting said first and second reflecting plates with said third reflecting plate.

6. An illumination device as claimed in claim 5, said first to fifth reflecting plates are portions of an integral reflector prepared by bending a single reflecting plate.

7. An illumination device as claimed in claim 4, further comprising connect means for connecting said first and second reflecting plates with said third reflecting plate.

8. An illumination device comprising:
   an elongated light source for illuminating an original;
   a lens array extended to the longitudinal direction of the elongated light source for transmitting the light from the illuminated original to a receiving plane;
   a first and second reflecting plate each of which is disposed at each side of the optical path from the original to the lens array with respect to the longitudinal direction of the elongated light source and opposed to the outside of the area to be illuminated for reflecting the light from the light source toward the original; and
   a third reflecting plate being disposed at the opposite side to the light source with respect to said optical path and extended to the longitudinal direction of the elongated light source so as to oppose to the illumination area for reflecting the light from the light source toward the original.

9. An improved photocopier assembly comprising:
   means for supporting a document to be copied;
   means for recording the image on the document for reproduction on copy paper, and
   means for illuminating the document in a uniform manner including an elongated source of light having a variable illumination characteristic across its length and an internal light reflector specifically bent into a configuration to provide reflection facets on either side of an optical path from the source of light to the supporting means, the reflection facets positioned to substantially compensate for the variable illumination characteristics of the elongated light source.

10. The photocopier assembly of claim 9 wherein five reflector facets are provided.

* * * * *